United States Patent [19]

Wolanski et al.

[11] Patent Number: 4,869,811
[45] Date of Patent: Sep. 26, 1989

[54] ROTOR FOR MAGNETICALLY SORTING DIFFERENT METALS

[75] Inventors: Richard B. Wolanski, Canton; Richard R. Osterberg, Dexter, both of Mich.

[73] Assignee: Huron Valley Steel Corporation, Belleville, Mich.

[21] Appl. No.: 215,282

[22] Filed: Jul. 5, 1988

[51] Int. Cl.$^4$ ............................ B03C 1/18; H01F 7/02
[52] U.S. Cl. ........................................ 209/212; 335/304; 209/636
[58] Field of Search ................. 209/8, 38, 44.1, 212, 209/606, 631, 636, 638, 642; 335/302–304, 306

[56] References Cited

U.S. PATENT DOCUMENTS

| | | | |
|---|---|---|---|
| 3,168,686 | 2/1965 | King et al. | 335/306 |
| 3,365,599 | 1/1968 | Brzezinski et al. | 335/304 X |
| 3,448,857 | 6/1969 | Benson et al. | 209/212 |
| 3,454,913 | 7/1969 | Israelson et al. | 335/306 |
| 3,710,291 | 1/1973 | Nicoud | 335/306 |
| 3,929,519 | 12/1975 | Benz | 335/306 |

FOREIGN PATENT DOCUMENTS

| | | | |
|---|---|---|---|
| 3416504 | 11/1985 | Fed. Rep. of Germany | 209/212 |
| 52-74168 | 6/1977 | Japan | 209/212 |

*Primary Examiner*—Johnny D. Cherry
*Assistant Examiner*—Edward M. Wacyra
*Attorney, Agent, or Firm*—Harness, Dickey & Pierce

[57] ABSTRACT

A drum-like rotor having numerous, closely spaced, elongated rows formed of permanent magnets arranged end-to-end and secured to the outer surface of the rotor, produces a high-density, rapidly reversing magnetic field in a band-like zone which is spaced a short distance from, and extends along the length of, the rotor outer surface. The magnetic field induces eddy currents in pieces of different metals passed through the zone which produces repulsive magnetic forces of different intensities in different metal pieces, and thus, magnetically separates such pieces. The rows of magnets, in their radial direction, are alternatingly thicker and thinner, so that the outer surface of the thinner rows are depressed relative to their adjacent thicker rows. The outer surface of the magnets of each thicker row have a polarity which is opposite to the polarity of their next adjacent thicker row magnets, and the direction of the magnetic polarity of the magnets of the thicker rows are radial relative to the rotor. The side edges of the magnets of the thinner rows have the same polarity as the polarity of the outer surfaces of their adjacent thicker row magnets. The directions of the magnetic polarity of the thinner row magnets are generally circumferential, relative to the rotor. Thus, magnetic flux flows transversely through each of the thinner row magnets and then radially outwardly through their adjacent thicker row magnets, returning over the exposed surfaces of the thinner row magnets to the next adjacent row of thicker magnets and, thereafter, radially inwardly of the rotor and transversely of the thinner row. Thus, the direction of the magnetic flux flow through the zone changes as the successive thicker and thinner rows pass alongside of the zone as the rotor rotates.

6 Claims, 1 Drawing Sheet

U.S. Patent   Sep. 26, 1989   4,869,811
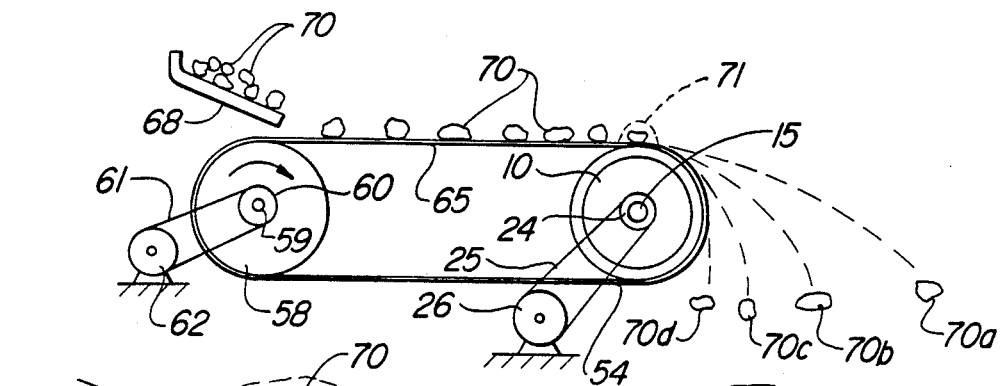
*Fig-1*
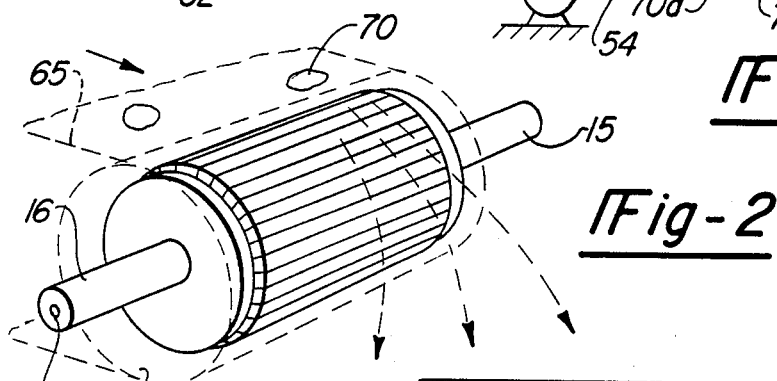
*Fig-2*
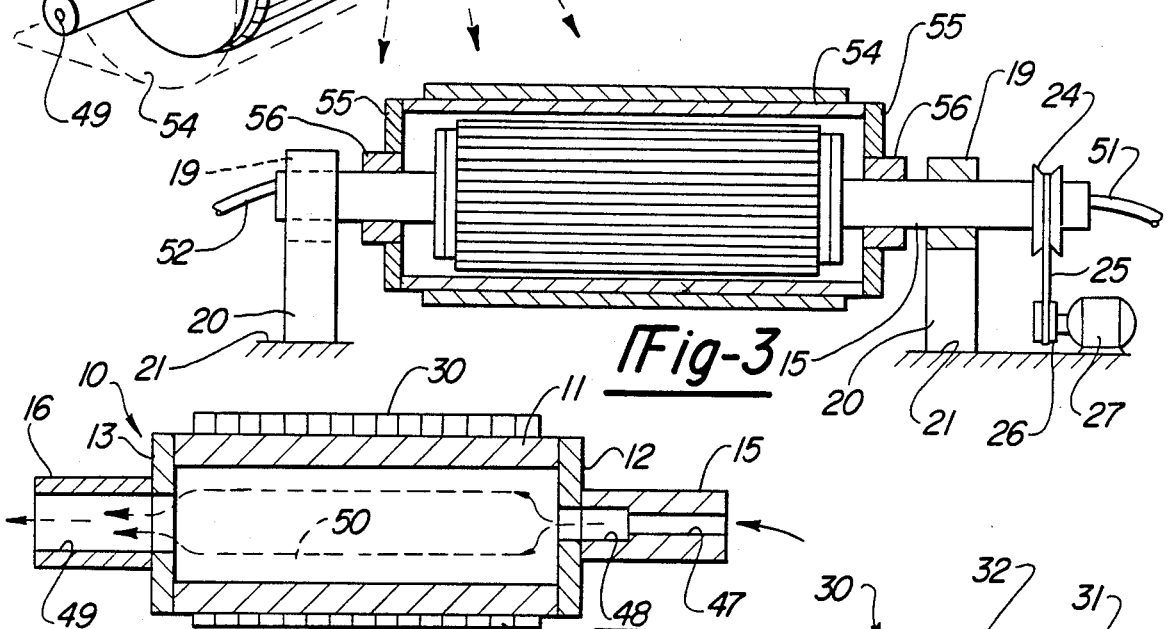
*Fig-3*
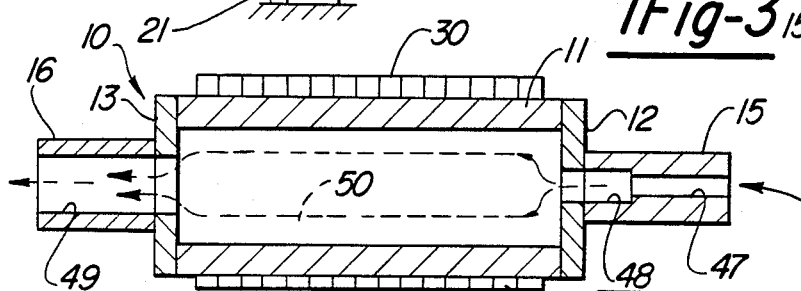
*Fig-4*
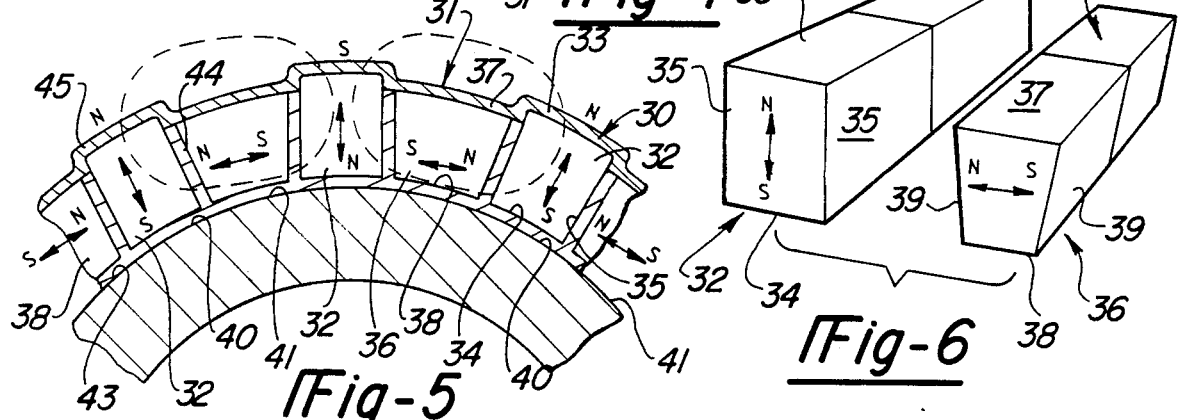
*Fig-5*   *Fig-6*

ROTOR FOR MAGNETICALLY SORTING DIFFERENT METALS

BACKGROUND OF INVENTION

This invention relates to a permanently magnetized rotor which, upon rotation, produces a zone of high-density, rapidly reversing flux through which pieces of different metals may be passed for magnetically separating them into groups. This rotor relates to the method and apparatus for sorting non-ferrous metal pieces disclosed in our U.S. Pat. Application Ser. No. 07/093,197, filed Sept. 4, 1987, now U.S. Pat. No. 5,834,870.

It is conventional to shred or break scrap automotive vehicles into small pieces. These pieces comprise different metals which are mixed together as a result of the shredding or breaking operation. Magnetizable ferrous metal pieces may be removed by suitable magnetic devices. This leaves a residue of pieces formed of different metals, such as of lead, zinc, copper, brass, aluminum and stainless steel, which do not respond to magnetic removal devices. These pieces of metal are worthless when mixed together, but can recycled and reused if they are separated into groups of like metals.

In the past, the separation or sortation of the non-ferrous metal pieces (including stainless steel as a non-ferrous metal because of its lack of response to magnetic sorting devices) has been done manually. That is, a worker visually observes a collection of commingled pieces and visually selects, and manually removes from the collection, those pieces which appear to be of the same metals. Particularly when dealing with automotive scrap metal, the different metal pieces can be readily observed because of their different shapes or appearances. However, this requires a considerable amount of labor and is a slow method of sortation. As a practical matter, this can be accomplished only in places where the labor costs are exceedingly low, such as in some of the Third World countries. Thus, in the past, shipments of mixed pieces of scrap metal have been sent to such countries by ship and, after the metal pieces have been sorted, they have been returned for re-melting and re-use. Because of the considerable shipping expense, notwithstanding the low labor costs, it has been not feasible, in many instances, to sort such mixtures of different metal pieces and, therefore, these have merely been discarded without further use.

We have discovered that subjecting such non-ferrous metal pieces to a high-density, rapidly changing, strong magnetic flux field induces an eddy current in the pieces which produces a repulsive magnetic force in the pieces that is generally proportional to the types of metal which the pieces comprise. This repulsive force can cause the respective pieces, when passed through a zone of such flux, to freely travel away from the field in different length trajectories, depending upon the types of metal. Thus, by subjecting substantially similar-size pieces to such a magnetic flux field, their different trajectories permit collecting the pieces in groups of different metals.

By way of example, when moving different pieces, of approximately the same size, of different metals through a zone or area of such rapidly changing, high-density, strong magnetic flux field, the pieces made of aluminum tend to freely fly a much greater distance from the field than pieces of copper, which in turn fly further from the field than pieces of zinc. Brass pieces remain closer to the field and lead pieces remain even closer. Hence, different material pieces are magnetically sorted into like metal groups by the distance which they travel.

In order to produce the required magnetic field, a magnetic rotor may be utilized. This invention relates to a permanent magnet rotor which produces a very high flux density, rapidly changing, strong flux field in a preselected zone through which scrap metal pieces may be passed for sortation purposes. However, this rotor may also be utilizable for other purposes where a similar magnetic field is desirable.

SUMMARY OF INVENTION

The invention herein contemplates a permanently magnetized rotor formed of a cylindrical, hollow drum upon whose peripheral surface rows of permanent magnets are secured. The rows extend along the length of the rotor and are closely adjacent to each other. The direction of polarity of every other row is radial, with their exterior surface polarities being opposite. However, the direction of polarity of the rows between them is circumferential or transverse with the polarity at the edges being the same as the outer surface polarity of the adjacent row against which each particular edge is positioned.

The arrangement of the alternating radial and circumferential polarity directions of adjacent rows produces a magnetic flow path which is circumferential through one row, radially outwardly through the next row, circumferentially above the first-mentioned row, radially inwardly through the next row to return to the first-mentioned circumferential row. This results in a series of closed loops of flux appearing around the entire periphery of the rotor drum.

The strengths of the series of magnetic loops are substantially increased by reducing the thicknesses of the rows of circumferentially directed polarity, relative to the thicknesses of the rows of radially directed polarity. That is, the circumferentially directed polarity row magnets have their outer surfaces depressed radially inwardly relative to the outer surfaces of their adjacent rows of magnets of radial polarity.

By rapidly rotating the rotor, a band-like zone of rapidly reversing, high-density magnetic flux is produced along the length of the rotor. By holding the rotor horizontally, and selecting a narrow, band-like zone or area located above the rotor, metal pieces may be moved horizontally through the zone above the rotor. As each piece passes through the zone, it is momentarily subjected to the magnetic flux which induces an eddy current within the piece. This eddy current, in turn, produces a repulsive magnetic force in the piece which repels the piece from the zone. By moving the piece through the zone upon a horizontal conveyor which ends at the zone, the repulsive force causes the piece to freely continue moving along a trajectory whose length will vary depending upon the strength of its repulsive force. This strength is correlated to the particular type of metal of which the piece is formed. Thus, the distance which the piece moves away from the zone is proportional to the kind of metal out of which the piece is made. Therefore, different metals are separated by the distances which the individual pieces travel from the zone.

In order to more closely fit the rows together to completely cover the curved peripheral surface of the rotor, the thinner, circumferentially polarized row magnets maybe formed in a substantially trapezoidal shape.

However, the thicker magnets may be substantially rectangular in cross-section. Thus, the adjacent rows may be closely abutted side-by-side. The rows are secured together and to the surface of the rotor drum by means of a strong adhesive.

As can be seen, an object of this invention is to provide a rotor with permanent magnet rows which are arranged so as to produce numerous, high density magnetic flux loops which move circumferentially, radially outwardly, circumferentially back and radially inwardly of the rotor along small segments of the rotor. Thus, rapid rotation of the rotor causes rapid changes of the flux field within a specific narrow, band-like zone along the side of the rotor.

Another object of this invention is to substantially increase the flux density, and thus the strength, of the magnetic field at a shore distance from the surface of the rotor, by utilizing thinner magnets for the circumferentially polarized rows and by correlating the polarity of the side edges of the thinner rows to the polarity of the exposed outer faces of the thicker rows.

Still a further object of this invention is to provide a relatively inexpensive and relatively simple to manufacture permanent magnet covered rotor which produces a high flux density, rapidly changing magnetic field in a narrow, band-like zone through which different metal pieces may be passed for producing repulsive forces in those pieces.

These and other objects and advantages of this invention will become apparent upon reading the following descriptions, of which the attached drawings form a part.

DESCRIPTION OF DRAWINGS

FIG. 1 is a schematic view of the sortation equipment showing the separation of different metal pieces along varying length trajectories.

FIG. 2 is a schematic, fragmentary, perspective view of the magnetic rotor and its surrounding conveyor belt upon which pieces to be sorted are moved.

FIG. 3 is a schematic, partially cross-sectioned view of the piece-carrying conveyor belt and the rotor and its support.

FIG. 4 is a cross-sectional view of the rotor.

FIG. 5 is an enlarged, schematic, cross-sectional view of a fragment of the rotor showing an end view of the rows of permanent magnets.

FIG. 6 is a perspective view showing a pair of adjacent rows of magnets.

DETAILED DESCRIPTION

Referring to FIG.4, the rotor 10 is formed of a hollow, elongated, magnetizable ferrows metal, generally cylindrically shaped drum 11. The opposite ends of the drum are covered by closures 12 and 13. A spindle or shaft 15 is secured to closure 12, and a corresponding spindle or shaft 16 is secured to the opposite closure 13.

As schematically shown in FIG. 3, the rotor spindles are journaled through, and are supported by, suitable bearings 19 which are carried upon the upper ends of support stanchions 20. The stanchions are mounted upon a fixed frame or floor 21.

A rotor drive pulley 24 is mounted upon spindle 15. The pulley is connected by a suitable drive belt or drive chain 25 to a motor pulley 26 mounted upon a variable-speed electric motor 27. Thus, energization of the motor results in rotation of the rotor at predetermined speeds, as for example, 1500–2000 rpm.

Alternating rows 30 and 31 of permanent magnets are secured upon the outer surface of the drum. The rows are of two different thicknesses to form pairs of alternatingly thick and thin rows 30 and 31. All of the thick rows are of the same radial dimension or thickness and all of the thin rows are of the same radial dimension.

Referring to FIGS. 5 and 6, the numerous permanent magnets 32 which form the thick rows 30 are preferably rectangular in cross-section and are arranged end-to-end to form their respective rows. Thus, each magnet 32 has an exposed face 33, a base 34 positioned against the drum, and side walls 35.

The numerous permanent magnets 36 which form the thin rows 31 are preferably shaped as isosceles trapezoids in cross-section. Thus, the wider base 37 of each magnet forms the exposed surface of the magnet. Its narrow base 38 is positioned against the outer surface of the drum. The sloped side walls 39 are preferably of the same angularity.

In order to mount the rows of magnets upon the drum, flat, elongated strips 40 and 41 are formed on the exterior surface of the drum. The strips 40 are wide enough to receive the bases 34 of the thick rows magnets 32. Similarly, the stripes 41, which alternate between the stripes 40, are of a width to receive and properly seat the narrow bases 38 of the thin row magnets 36.

The magnets are each secured to the drum and to each other by a suitable, high-strength adhesive. Suitable, adhesives are commercially available so that the selection of such adhesives may be made by those skilled in the art. Thus, a layer of adhesive 43 is applied to the stripes 40 and 41 for adhering the bases 34 and 38 of the magnets to their respective strips. Likewise, adhesive coatings 44 are applied between adjacent magnet side wall surfaces for adhering the magnets together.

After the magnets are adhered to each other and to the drum, an exterior coating 45 may be applied around the exterior surfaces of the magnets to protect them and prevent any loosening. That coating 45 is preferably formed a fiberglass, resin-reinforced fabric which may be tightly fitted against the respective exterior surfaces of the magnets or may, alternatively, be formed as a smooth exterior shell, that is, with varying thicknesses to accommodate to the depressed surfaces of the thinner magnets relative to the thicker magnets.

The magnets are made of a high-strength, permanent magnetic material such as commercially available neodymium iron boron material. This material can provide a strong magnet having a roughly 5000 gauss flux density at its surface. By way of example, to show the relative sizes of the magnets, the thicker magnets 32 may be about ⅜ inch wide, ⅜ inch high (i.e. radial relative to the drum), and about 1 inch long (i.e. measured in the lengthwise direction of the drum). Corresponding thinner magnets 36 may be approximately ½ inch wide, about ⅜ inch high and about 1 inch long (in the axial direction of the drum).

Where the thinner magnets are formed in a trapezoidal cross-section, their wider or exposed bases are slightly wider than their narrow bases, such as on the order of a 0.580 inch outer width compared to a 0.500 width. With these dimensions, a space of about 0.10–0.12 inch may be left between the walls of adjacent rows of magnets to provide space for the adhesive.

Significantly, the directions of the polarity of the thickness magnets extend radially, as indicated by the arrows and the N and S notations of FIGS. 5 and 6.

However, the directions of the polarities of the thinner magnets are transverse or circumferential relative to the rotor, as indicated by the arrows and the N and S notations on FIGS. 5 and 6.

As shown in FIG. 5, the polarity of the exposed face of each of the magnets in each thick row is opposite to the polarity of the magnets in the next adjacent thick row. Thus, there is an alternating north and south polarity on the exterior surfaces 33 of the thick rows around the circumference of the rotor. However, the polarity of the side faces 39 or edges of the thinner magnets are coordinated with the exterior surface polarity of the thicker magnets. Thus, the polarity at each side face 39 of each thinner magnet is the same as the polarity of the exposed outer face 33 of its adjacent thicker magnet. Consequently, the transverse or circumferentially directed polarities of the thin magnets add to the radial magnetic flux flow to substantially increase the flux flow that is generated between each adjacent group of two thick magnets and the thin magnets between them. This flux is increased and strengthened by the depression of the exterior surfaces of the thin magnets a sufficient degree to inhibit short-circuiting of the magnetic flux over the exposed surfaces of the thinner magnets. The degree of depression of the exposed thin magnet surface relative to the exposed thick magnet surfaces can be varied and determined by trial and error for optimum results. By way of example, in the size magnets mentioned above, the exposed surfaces of the thinner magnets are despressed about $\frac{1}{8}$ inch radially inwardly of the exposed surfaces of the thicker magnets.

The rapidly changing magnetic fields tend to heat the drum and, if uncontrolled, the heat may reach a point where the permanent magnets will be ruined. Magnets formed of neodymium iron boron material can be demagnetized or ruined at roughly 450 degrees F. Thus, it is desirable to keep the drum temperature below that amount and preferably below about 150 degrees F. This is accomplished by circulating cool tap water through the drum. For this purpose, spindle 15 is provided with a central bore 40, whose inward portion 48 is widened. Water flows into the drum through the bore to form a layer of water 50 around the interior surface of the drum, as indicated in dotted lines in FIG. 4.

A bore 49 formed in spindle 16 provides an exit for the water when the layer of water 50 becomes sufficiently deep to overflow through the bore 49. To supply the water, an inlet line 51 is attached to the bore 47 of the spindle 15, and a drain line 52 is attached to the bore 49.

Referring to FIG. 1, the rotor is surrounded by a forward conveyor pulley 54 which may be made of a thin wall cylinder of a non-magnetic material. As an example, the material forming the wall of the cylinder may be made of "Kevlar," a DuPont trademark for a plastic material which, with suitable resin reinforcement, may form a rigid, thin cylinder of about 1/16 inch wall thickness. The pulley is provided with end caps 55 (see FIG. 3) having central bearings 56 through which the spindles 15 and 16 extend.

A rear pulley 58, similar in construction to the forward pulley 54, is rotatably mounted on a suitable shaft 59 at some distance from the forward pulley. The shaft 59 is provided with a shaft drive pulley 60 which is connected by a suitable belt or drive chain 61 to a motor-driven pulley 62 attached to a variable-speed motor.

A conveyor belt 65 formed of a non-magnetizable, flexible material of a type which is suitable to sustain the abrasive forces and the loads required, extends over and between the forward pulley 54 and rear pulley 58. The linear speed of the conveyor may be varied by suitably varying the speed of the motor-driven pulley 62. The conveyor belt and its pulleys are intended to move at a much slower speed than the rotor. Thus, the forward pulley 54 rotates independently of the rotor, by being rotatably mounted upon the rotor spindles.

A suitable delivery slide or conveyor belt 68 (see FIG. 1) delivers pieces 70 to the conveyor belt 65. The pieces 70 may be of different metals which are mixed together into an unsorted mixture of pieces which are generally of the same size. That is, it is desirable, before the magnetic sortation, to initially sort the scrap pieces into groups of approximately the same sizes.

As the pieces 70 advance along the conveyor belt, they pass through a bank-like elongated zone 71 of high-density magnetic flux. The zone is located above the rotor. Since the flux density rapidly deteriorates with increased distance from the magnetic source, the zone is close to the rotor. That is, the pulley is of a thin wall construction, such as 1/16 inch, and the belt is likewise of a thin construction of perhaps another 1/16 inch. The pulley is closely spaced to the rotor, such as on the order of $\frac{1}{8}$ inch away from the rotor. Hence, the surface of the belt may be about $\frac{1}{4}$ inch away from the rotor surface, and the "working zone" may be on the order of between about $\frac{1}{4}$ inch to about $\frac{3}{4}$ inch, or about $\frac{1}{2}$ inch high, relative to the rotor. These dimensions are approximate and will vary depending upon the construction of the particular apparatus involved. However, it is intended that the working zone through which the metal pieces are passed should be as close to the rotor surface as feasible to obtain the greatest flux density.

As each piece passes through the working zone 71, the rapid changing of the flux flow direction in that piece induces an eddy current which, in turn, produces a repulsive magnetic force in the piece. That repulsive force, along with the inertia due to the forward movement of the piece along the conveyor belt, flings the piece forwardly along a forwardly and downwardly trajectory. The trajectories of the pieces are proportional to the kinds of the metal of which they are formed. Thus, as shown in FIG. 1, three trajectories 70a, 70b and 70c are illustrated to indicate three different material pieces. For example, the furthest trajectory 70a could be for a piece made of aluminum. The shortest trajectory 70c could be for a piece made of lead, and the middle trajectory 70b could be for a piece made of brass or zinc. Pieces that are made of plastic, glass or stainless steel tend to fall directly down, as indicated by the generally vertically down trajectory 70d.

As a rough example of the speed of operation, assuming a one-inch long piece of metal and a conveyor belt speed of about 50 feet per minute, the piece tends to move through the working zone 71 in roughly 0.10 seconds per inch. Utilizing a drum containing 52 rows of 26 alternating pairs of thick and thin rows, depending upon the speed of rotation, the number of magnetic field cycles affecting that piece could be in excess of 100 reversals. This produces different length trajectories which provide sufficient separation of the pieces to group them by their constituent materials.

Preferably, in commercial operation, a number of separate rotors and conveyor arrangements of the type schematically illustrated in FIG. 1 may be used to provide sequential sorting stations. Thus, each mixture may be sorted and resorted to sequentially remove pieces of particular metals from the mixture of each station.

A dipole may be located above the rotor to distort or vertically elongate the magnetic fields in the working zone. Such a dipole can be formed of an elongated piece of iron arranged a short distance above and parallel to the axis of the rotor. The lower surface of the iron piece may be covered with a row of permanent magnets of the type mentioned above. This row of permanent magnets will tend to draw and repel the changing magnetic fields and, thereby, assist in changing the fields rapidly as they affect the pieces passing through them.

This invention may be further developed within the scope of the following claims. Accordingly, having fully described an operative embodiment of this invention, we now claim:

1. A rotatable magnetic rotor for producing a high-density, rapidly reversing magnetic flux field in an elongated, narrow, band-like zone that is spaced a short distance from the periphery of the rotor and extends parallel to the axis of the rotor, comprising:

a hollow, substantially uniform wall thickness, cylindrical drum formed of a ferrous material, and having an outer surface and a central axis about which the drum is rotated;

numerous, closely adjacent, narrow, permanent magnet rows secured upon the drum outer surface;

the rows being alternatingly thicker and thinner, measured in a direction radially of the drum, to form pairs of adjacent thicker and thinner rows around the circumference of the drum, and with the rows having exposed outer surfaces so that the outer surfaces of the thinner rows are depressed relative to the outer surfaces of the thicker rows;

the thicker rows being substantially rectangular in cross-section and formed of a plurality of substantially identical permanent magnets arranged end to end;

the thinner rows formed of a plurality of substantially identical permanent magnets arranged end to end having their sides slightly converging in a direction toward the interior of the drum, so that they are generally trapezoidal in shape to substantially abut the thicker rows enabling the thicker and thinner rows to be bonded to one another and form a continuous peripheral surface providing a substantially continuous magnetic surface about the drum;

the directions of polarity of the thicker rows extending radially of the drum and the exposed outer surface of each thicker row being of an opposite polarity to the polarity of the next adjacent thicker row;

the directions of polarity of the thinner rows extending generally circumferentially of the drum, that is, approximately perpendicular to the directions of polarity of the thicker rows, and with the magnet polarity of each of the side edges of the thinner rows being the same as their adjacent thicker row outer, exposed surface magnetic polarity;

whereby a closed magnetic flux path is established between each thinner row and its two adjacent thicker rows, which path extends in a generally circumferential direction through the thinner row and in a generally radially outwardly direction through one of its adjacent thicker rows, then over the exposed outer surface of the thinner row to the opposite thicker row and back through such opposite thicker row, and so that the rotation of the drum momentarily positions each of said closed flux paths in the zone to produce a rapidly alternating, high-density flux field through the zone.

2. A magnetic rotor as defined in claim 1, and including parallel, flat stripes formed along the length of the rotor upon its exterior surface, to provide flat, elongated, support bases for the rows, with the width of the bases for the thinner rows being slightly narrower than the widths of the bases for the thicker rows, and with the thicker rows being substantially rectangular in cross-section, while the thinner rows are in the shape of an isosceles trapezoid in cross-section with their narrow bases arranged against their drum support bases and their sloped sides against the sides of the thicker rows.

3. A magnetic sorter rotor for applying rapidly reversing, high-density magnetic flux fields to mixtures of irregularly shaped pieces of different non-ferrous metal for inducing repulsive forces in the pieces for use in sorting and separating the pieces into predetermined groups, comprising:

a hollow, generally uniform wall thickness, cylindrical drum formed of a ferrous material and having an outer peripheral surface and a substantially horizontally arranged central axis about which the drum is rotated;

closely spaced, narrow, permanent magnet rows secured upon the drum outer peripheral surface, with each row having an outer exposed surface, a base surface located upon the drum outer peripheral surface, and elongated opposite side edges;

with the rows being alternatingly thicker and thinner in dimension taken radially outwardly of the drum outer peripheral surface, so that the outer surface of each thinner row is depressed towards the central axis of the drum relative to the outer surfaces of its adjacent thicker rows;

the thicker rows being substantially rectangular in cross-section and formed of a plurality of substantially identical permanent magnets arranged end to end;

the thinner rows formed of a plurality of substantially identical permanent magnets arranged end to end having their sides slightly converging in a direction toward the interior of the drum, so that they are generally trapezoidal in shape to substantially abut the thicker rows enabling the thicker and thinner rows to be bonded to one another and form a continuous peripheral surface providing a substantially continuous magnetic surface about the drum;

the direction of the polarity of the thicker rows being generally radial relative to the drum, with the outer surface of each thicker row being of the opposite polarity than the polarity of the outer surface of the next adjacent thicker rows;

and the direction of the polarity of the thinner rows being generally circumferential, that is, extending transversely from side edge to side edge, with the polarities of the side edges being the same as the polarity of their adjacent thicker row exposed outer surfaces;

whereby a magnetic flux field flows transversely through each thinner row and then radially outwardly through one of its two adjacent thicker rows and over the depressed outer surface of that thinner row to return radially inwardly through its opposite adjacent thicker row, and whereby rotation of the rotor produces a rapidly changing, high flux density magnetic field in an elongated band-like zone located slightly above the rotor and extending generally parallel to the drum central axis for inducing repulsive forces in pieces of different metals which are passed transversely through that zone to assist in sorting the different metal pieces.

4. A magnetic sorter rotor as defined in claim 3, the thinner row magnets being substantially isosceles trapezoidal in cross-sectional shape.

5. A magnetic sorter as defined in claim 3, and including flat, axially extending stripes formed on the outer peripheral surface of the drum, with each row being seated upon one of the stripes, and each stripe being approximately as wide as the width of the row seated thereon;

and with the rows being secured upon the stripes with an adhesive.

6. A magnetic rotor for applying rapidly reversing, high-density magnetic flux fields to mixtures of irregularly shaped pieces of different non-ferrous metal for inducing eddy currents causing repulsive forces in the pieces for use in separating the pieces into predetermined metal groups, comprising:

a cylindrical drum having an outer peripheral surface and a substantially horizontally arranged central axis about which the drum is rotated;

closely spaced, narrow, permanent magnet rows secured upon the drum outer peripheral surface, with each row having an outer exposed surface and a base surface which is located upon the drum outer peripheral surface, and elongated opposite side edges;

the rows being alternatingly thicker and thinner, measured in a direction radially of the drum, to form pairs of adjacent thicker and thinner rows around the circumference of the drum, and with the rows having exposed outer surfaces so that the outer surfaces of the thinner rows are depressed relative to the outer surfaces of the thicker rows;

the thicker rows being substantially rectangular in cross-section and formed of a plurality of substantially identical permanent magnets arranged end to end;

the thinner rows having their sides slightly converging in a direction toward the interior of the drum, so that they are generally trapezoidal in shape to substantially abut the thicker rows enabling the thicker and thinner rows to be bonded to one another and form a continuous peripheral surface about the drum;

the rows being formed in adjacent pairs with the direction of polarity of the thicker magnets in one row being generally radial of the rotor, and with the directions of polarity of the thinner magnets in the adjacent row of the pair being generally circumferential of the rotor;

with the polarity at the outer surfaces of the thicker magnets of each row of radially directed polarity being the opposite to the polarity of the outer surface of its next adjacent row of radially directed polarity;

and with the polarity of each of the sides of the thinner magnets of the rows of circumferentially directed polarity being the same as the polarity of the outer surface of their adjacent magnets of their adjacent rows of circumferentially directed polarity;

whereby a closed magnet flux path is established between each thinner row and its two adjacent thicker rows, which path extends in a generally circumferential direction through the thinner row and in a generally radially outwardly direction through one of its adjacent thicker rows, then over the exposed outer surface of the thinner row to the opposite thicker row and back through such opposite thicker row, whereby rotation of the drum momentarily positions each of said closed flux paths adjacent a zone containing said mixture of pieces to produce a rapidly alternating, high-density flux field through the zone.

* * * * *